April 23, 1935.  H. C. HEATON  1,998,811
HYDRAULIC BRAKE
Filed Nov. 9, 1929  3 Sheets-Sheet 1

Witness:
William P. Kilroy

Inventor
Herman C. Heaton
By Brown, Jackson, Boettcher & Dienner
Attys

April 23, 1935. H. C. HEATON 1,998,811
HYDRAULIC BRAKE
Filed Nov. 9, 1929 3 Sheets-Sheet 2

Witness:
William P. Kilroy

Inventor,
Herman C. Heaton
By Brown, Jackson, Boettcher & Dienner
Attys.

April 23, 1935.  H. C. HEATON  1,998,811
HYDRAULIC BRAKE
Filed Nov. 9, 1929   3 Sheets-Sheet 3
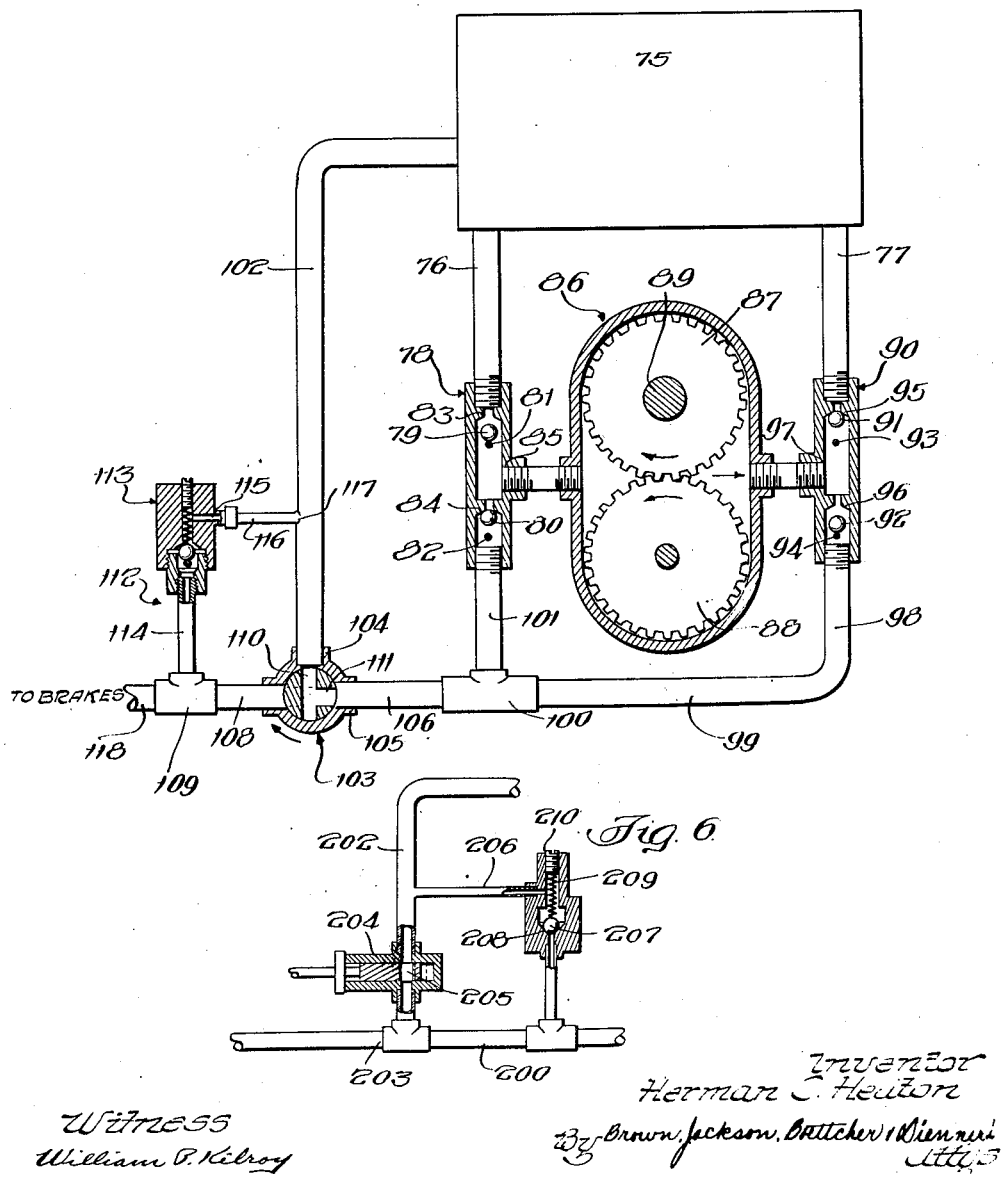

Patented Apr. 23, 1935

1,998,811

UNITED STATES PATENT OFFICE 1,998,811

HYDRAULIC BRAKE

Herman C. Heaton, Kenilworth, Ill.

Application November 9, 1929, Serial No. 405,863

10 Claims. (Cl. 188—152)

This invention relates to braking devices, and more particularly to an improved fluid pressure braking device especially adapted for use on motor vehicles.

This invention may be characterized as an improvement upon the braking device illustrated in the copending application of Harry A. Musham, for Hydraulic brakes, Serial No. 157,929, Filed December 30, 1926, of which I am the assignee of the entire right, title and interest.

In the device disclosed in the copending application above noted a multiplicity of suitable spaced apart braking discs are mounted on the axle of a wheel, actuated by the introduction of fluid under pressure into thin, substantially flat, annular vessels, interposed between the discs and concentrically mounted with respect to the axle of the wheel.

Coil springs are employed to withdraw or contract each pair of discs from contact with the wheel braking surfaces.

The instant invention has for its main object the provision of an improved hydraulic braking system having a substantial braking area and the operation of which is simple and positive. To this end I have provided a hydraulic braking system in which I employ a multiplicity of concentrically mounted, normally contracted discs which are adapted to be expanded by two series of annularly interposed thin vesels under fluid pressure introduced into the vessels, to engage braking surfaces on the brake drum of a wheel.

Another object is the provision of a brake wherein the time required for expanding the brake discs is reduced to a minimum. This is accomplished by the provision of a multiplicity of vessels each expanded by an independent fluid duct connected therewith. These vessels are generally circular in shape and a series of them are positioned between the braking discs in a circumferentially spaced relation, about the axle of the wheel so that they are concentric thereto. This arrangement provides for a quick distribution of pressure to the brakes.

A further object is the provision of a braking system in which the amount of fluid employed is reduced to a minimum. By the employment of a multiplicity of independently operated small vessels, the volumetric displacement of the expanding means is materially reduced as compared with the concentric annular vessels employed in the device disclosed in the copending application above referred to. Thus the amount of fluid employed is materially reduced.

Another object is to provide a simple and efficient fluid braking means wherein the braking action will be positive. By providing a multiplicity of vessels, if one or two of these fail to operate or expand, the remainder will still effectively and positively provide a braking action.

Another object is the provision of a novel and simple fluid circulation system for such a braking system.

A further object is the provision of a novel control means for a fluid braking system wherein the braking action may be effectively controlled by either the foot or the hand of an operator. To this end, I have provided a simple control means, operable from the steering column of a vehicle above the steering wheel as well as by the conventional foot pedal control. The advantage of such a control means will be obvious particularly when the vehicle is running down a long, relatively steep hill. The continual application of a foot pedal to operate the brakes becomes tiresome. With my novel finger operated control this condition is alleviated thereby permitting of alternate control of the brakes by the hand or foot of an operator. For purposes of clarity and demarcation, I shall apply the term "hand service brake control" to this feature of my invention. Both the hand operated control and foot operated control members are adapted to operate upon a single control valve there being a provision for the operation of the one without interference by the other and vice versa. With such an arrangement either hand or foot may be employed equally effectively to apply the service brakes.

Another object is the provision of a relief valve in the circulation system. When the control valve in the circulation system is operated to cut-off the circulation so that pressure is directed to the brakes, the instantaneous application of the pressure would tend to bind the brakes causing a sudden stopping of the vehicle. In order to insure of smooth action of the brakes, I have provided a relief valve in the circulation system. The valve is of the type normally held in open condition by a spring and will remain open until a predetermined pressure is built up in the system, when the valve will be closed by the excessive pressure. In operation in the circulation system, when the control valve is set to direct fluid pressure to the brakes, some of the fluid will be directed through the relief valve so that a portion of the initial pressure is dissipated through the relief valve and back into the circulation system. When the pressure has been sufficiently built up, the relief valve automatically closes under the excessive pressure thus permitting all the pressure to be transmitted to the brakes.

A further object is the provision of a fluid impelling means in a circulation system adapted to be operated from the line shaft of the vehicle ahead of the transmission and behind the clutch. By positioning the pump of the circulation system so that it is operated by the line shaft, the fluid is impelled in the circulation system in the same direction regardless of whether the vehicle is moving forwardly or rearwardly.

In the event of failure of the power plant, the fluid impelling device would still operate due to the transmission of motion to the line shaft by the rotation of the driving wheels of the vehicle through the propeller shaft and transmission. Thus the danger of failure of the circulation system regardless of the failure of the power plant is eliminated, insuring of operation of the braking system.

Another object is the provision of a novel circulation system wherein fluid impulsion is obtained regardless of the direction of operation of the pump mechanism. If a vehicle provided with a circulation system in accordance with the foregoing should become stalled on a hill and begin to roll backwards, it is evident that the shaft thereof through the drive wheels and differential will be rotated in a direction reversed to that in normal operative condition. Thus a unidirectional fluid impulsion system would fail to operate due to such a reversal of rotation. To avoid such a condition, I have provided a circulation system in which the fluid may be impelled to the brakes by rotation of the pump mechanism in either direction. This is accomplished by the provision of dual lead lines from the reservoir to the pump and thence to the outlet line and by the provision in such lines of a novel check valve arrangement whereby fluid impulsion may take place in either direction in the pump from the reservoir to the outlet line. Owing to the duo-directional fluid impulsion capabilities of this novel system, it will be evident that the system may be mounted on a vehicle to be operated by the propeller shaft of the vehicle instead of the line shaft thereof as hereinbefore outlined.

As in the case of the previously described system, it is desirable to employ a relief valve to avoid a sudden application of pressure and possibility of locking of the brakes. In the present instance the relief valve has been positioned in the leak-off connection so that the leak-off connection serves a dual function of relieving instantaneous and sudden pressure application where pressure is transmitted to the brakes and of permitting the leak-off of the excess fluid in brake lines when the pressure is taken off by cutting off the brake lines from the circulation system. It is, therefore, a further object of this invention to provide a leak-off connection which has the additional function of acting as an initial pressure relief line.

Other and further objects will appear from the following detailed description of an embodiment of my invention illustrated in the accompanying drawings in which:

Figure 5 is a more or less diagrammatical illustration of a modified form of circulation system capable of operation in either direction of rotation of the pump, showing the control valve, pump, check valves and relief valve in section; and Figure 6 is a fragmentary view showing another form of controlling valve for the system.

Figure 1:
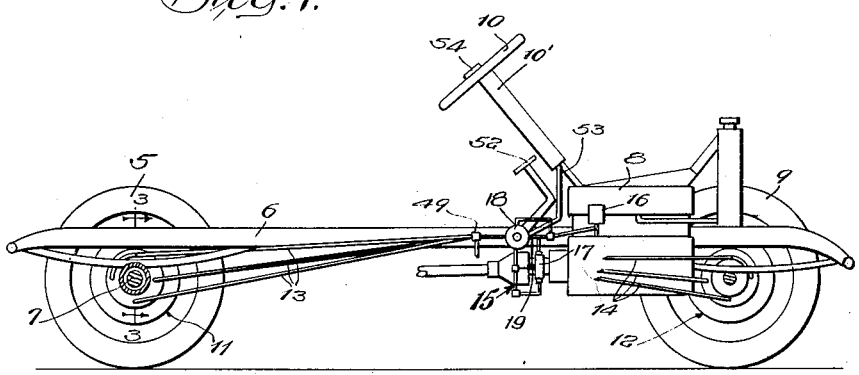
Figure 1 is a fragmentary sectional elevation of the chassis of an automobile, illustrating in a more or less diagrammatical way the application of a brake system embodying the present invention.

In the embodiment of my invention illustrated in the drawings, referring particularly to Figure 1, I have shown an elevation of a section of a chassis of a motor vehicle taken along a longitudinal line thereof adjacent the foot operated brake pedal and more or less diagrammatically illustrating my improved braking system. The rear wheel 5 is mounted on the chassis frame 6 in any suitable or preferred manner and power is transmitted to it through the live axle 7 from the power plant 8 by any well known transmission mechanism. The front wheel 9 is mounted at the front end of the chassis frame 6 in any suitable way and is steered by the conventional steering wheel 10 which is suitably connected to the wheel axle by any well known means. These elements are all well known and since they per se do not form the subject matter of the present invention, they will be only generally referred to hereinafter.

The braking system in accordance with the present invention generally comprises brakes 11 and 12, fluid leads 13 and 14, and a circulation system 15 having a reservoir 16, pump 17, control valve 18 and relief valve 19.

Figure 4:
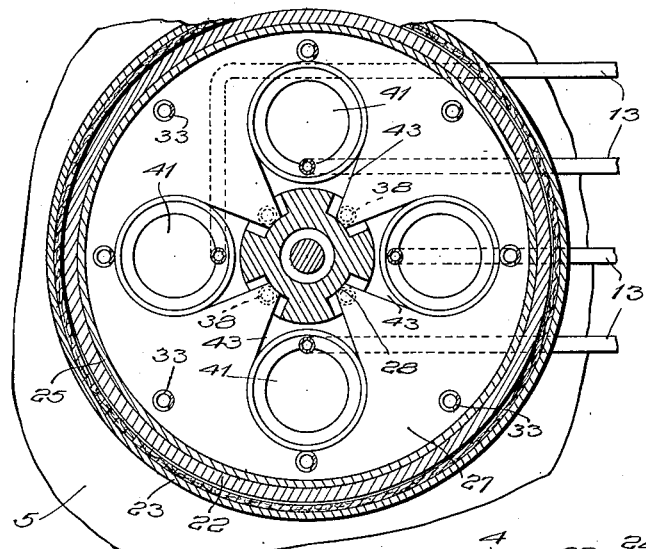
Figure 4 is a section taken along the line 4—4 of Figure 3; such section being shown on a smaller scale.
Figure 3:
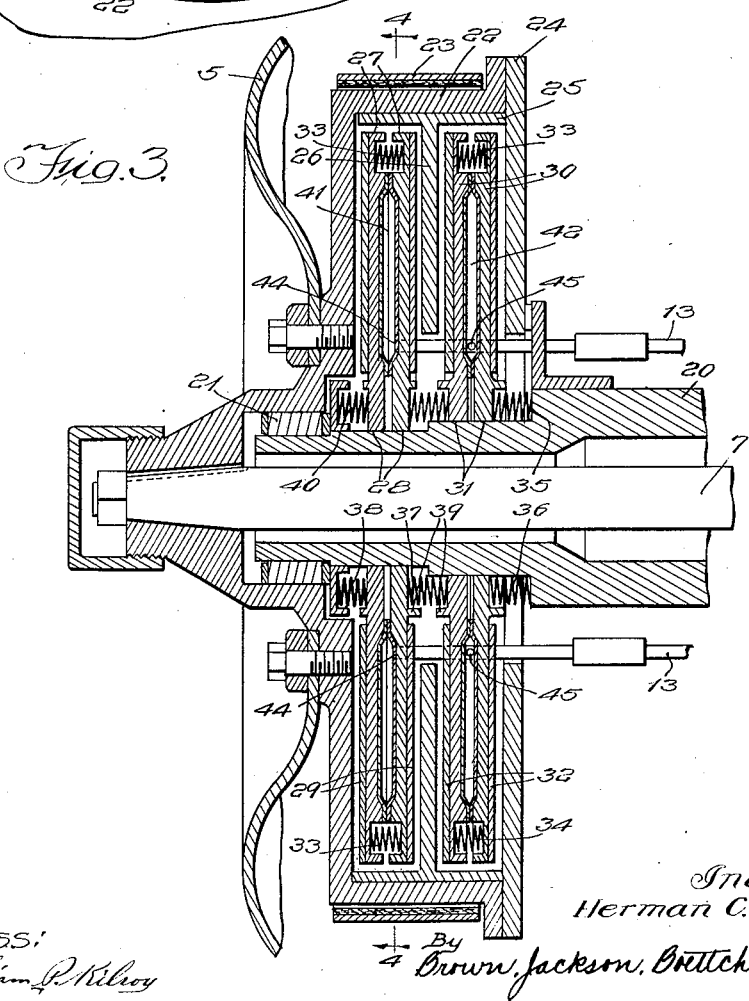
Figure 3 is a diametric section through a rear wheel and axle of the chassis illustrated in Figure 1 and taken along the line 3—3 thereof.

Referring particularly to Figures 3 and 4, the rear wheel 5 which for purposes of illustration is shown as a disc wheel, is rotatably and antifrictionally mounted on the stationary axle 20 by a suitable means such as a roller bearing 21, and carries a drum 22 forming a housing for the braking mechanism. The usual emergency brake 23 may be arranged to grip the outside of the drum 22. A cover plate 24 fastened in place in any suitable manner to the annular flange of the drum and rotatable therewith completes the enclosure and the radial face of the cover plate 24 and of the drum 22 provide opposed annular friction faces.

Fitting within the drum 22 and between the plate 24 and the radial wall of the drum is a ring member 25 having an annular, radially extending web 26. Ring member 25 is suitably secured to the peripheral flange of the drum and rotates therewith. The web 26 is disposed between the radial wall of the drum and the plate 24 and one side provides a friction braking surface in opposition to the radial wall of the drum 22 while the other side provides a friction braking surface in opposition to the cover plate 24.

Each brake comprises two pairs of braking elements to be hereinafter described, one disposed between the radial wall of the drum 22 and the web 26, and the other disposed between the web and the cover plate 24. These braking elements are adapted to be expanded to cause friction with the drum, web and cover plate, all of the latter of which are fixed with respect to each other and turn with the wheel.

The friction produced retards the rotation of the wheel side with respect to the axle 20.

Between the radial wall of the drum 22 and the web 26, are a pair of plates 27, suitably splined at 28 to the stationary axle 20 to prevent their rotation with respect to the shaft and each is provided with suitable friction facings 29 on the outer sides thereof, for engagement with the radial walls of the drum and the web 26.

The other braking element in like manner comprises a pair of stationary plates 30, suitably splined to the stationary axle 20 at 31 and positioned between the annular web 26 and the plate 24. These plates 30 are likewise provided with suitable friction facing plates 32 which are adapted to frictionally engage the web 26 and plate 24 for braking engagement therewith.

Interposed between the outer ends of each pair of plates 27 and 30, are a group of circumferentially spaced coil springs 33 and 34, respectively. The springs 33 and 34 may be held in position by being seated in oppositely disposed pockets or recesses in the approximately opposed surfaces of the plates 27 and 30 as shown in Figure 3.

The stationary axle 20 has a shoulder 35 and interposed between this shoulder and the adjacent plate 30 are a plurality of circumferentially spaced coiled springs 36. A similar group of springs 37 is interposed between the inner plates 30 and 27 and are held in position between the periphery of the axle 20 and flanges 39 provided on the plates.

Another set of similar springs 38 is mounted in circumferentially spaced relation about the axle 20 between a ring 40 and outer plate 27. The ring 40 is held in position on the axle 20 by the bearing 21, which is in turn retained on the axle in any suitable or desired manner.

The springs 33 and 34 tend to separate the outer edges of the plates 27 and 30, while the inner springs 36, 37 and 38 tend to move the inner edges of the pairs of plates 27 and 30 together.

The fluid pressure means provided for expanding the plates 27 and 30 to apply the brake comprises two series of thin, flat, circular vessels 41 and 42, each retained in circumferentially spaced relation about the axle 20 and between each pair of plates 27 and 30 in radially disposed clover leaf shaped recesses 43 formed in the inner opposed faces of the plates 27 and 30. Fluid conducting lines 13 are suitably connected with these vessels at 44 and 45 as indicated in Figure 3 of the drawings. It will be understood that the vessels 41 may be retained in position between each pair of brake discs in any other suitable or desired manner.

Figure 2:
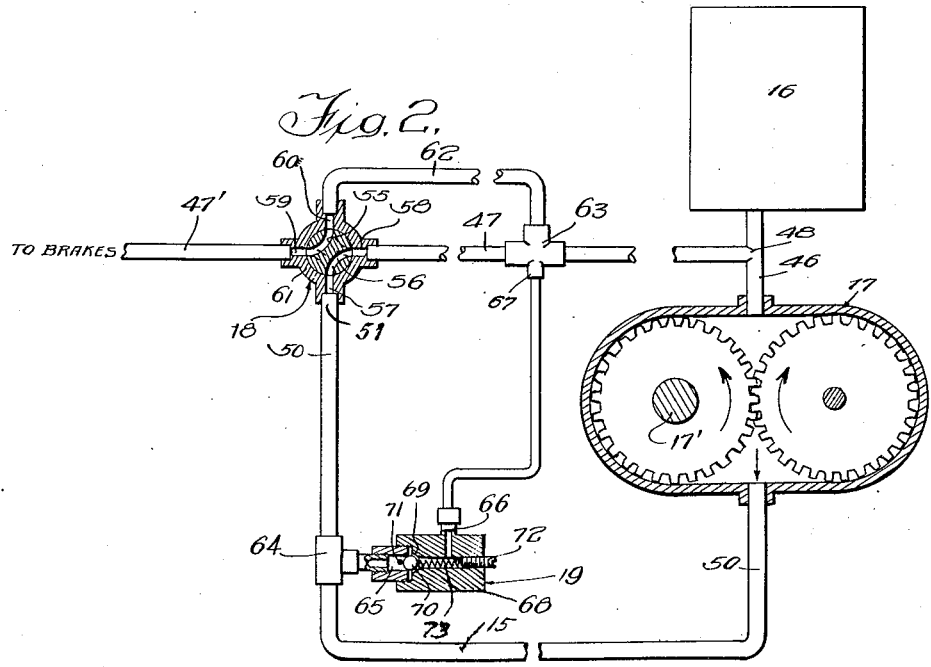
Figure 2 is a more or less diagrammatical illustration of the circulation system employed, showing the control valve, pump, and relief valve in section.

Referring now to the fluid circulation system which is diagrammatically illustrated in Figure 2, the system comprises a gear pump 17 suitably mounted on the line shaft 17' between the clutch and transmission of the power plant 8 and operated thereby.

This mounting may comprise a suitable connection to the clutch housing or the transmission housing with the line shaft 17' either passing through the pump housing as shown in Figure 2 or the pump may be otherwise suitably mounted adjacent the clutch housing and otherwise suitably operatively connected to the line shaft 17'. With the pump 17 connected to the line shaft 17' ahead of the transmission, it will be evident that the pump gears will always rotate in the same direction regardless of whether the vehicle is moving forwardly or rearwardly inasmuch as the line shaft always rotates in the same direction. Another advantage in mounting the pump on this shaft is that, should the power plant of the vehicle fail while the vehicle is proceeding forwardly in gear, the continued rotation of the driving wheels will continue to rotate the pump gears through the propeller shaft, transmission and line shaft, thus assuring of operation of the circulation system for subsequent application of the brakes, whether the clutch is engaged or not. Also, if the car is rolling backwards in gear, the operation of the system will continue regardless of clutch operation. This type of impelling fluid pressure will be referred to as "regenerative" in the appended claims.

A fluid reservoir 16 mounted adjacent the pump 17 is connected with the pump by a tube 46. A fluid line or lead 47 is also connected to the reservoir ahead of the pump 17 at 48 and extends to valve 18, to which another lead 47' is connected on the opposed side and which in turn connects the valve with distributing unit 49 (see Figure 1) from which the fluid leads 13 and 14 extend to the brakes.

Another tube 50 connects the outlet end of the pump 17 with the valve 18 at 51 spaced from the connection 48. The valve 18 is interposed in the line 47 between the connection 48 and the central distributing unit 49. Valve 18 is operatively connected to the brake pedal 52 which by its conventional rotary moment is adapted to open and close the circulation system 15 by opening or cutting off the line 47. The brake pedal 52 may be retained in inoperative or "open" position by a spring or any other suitable means. A hand operated lever 54 is suitably mounted on the steering column 10' and is adapted to rotate in a plane parallel to that of the steering wheel 10 and above the steering wheel. A suitable rod or shaft (not shown) is adapted to be rotated by this finger lever 54 and is operatively connected to a motion transmitting rod 53 which is in turn connected with the valve 18, a lost motion or other suitable connection being employed whereby the valve 18 may be operated by either the foot pedal 52 or the finger lever 54 each independently of the other and without interfering with each other.

The valve 18 has conduits 55 and 56 therein, which are adapted to cooperate with inlets 57 and 58 and outlets 59 and 60 in the valve housing 61. Outlet 60 is connected by a tube 62 to line 47 at 63 and constitutes a leak-off connection to the circulation system from the brake lines.

A relief valve 19 is connected to lead 50 at 64 at the inlet port 65 thereof and the outlet port 66 thereof is connected with line 47 at 67. The relief valve comprises a valve housing 68 having a valve seat 69 therein and a spring projected ball plunger 70 normally positioned out of the seat and retained against displacement by a transverse pin 71 or some other suitable means. A set screw 72 seated in a threaded bore in alignment with the valve bore is adapted to adjust the tension of the spring 73 to a predetermined reacting pressure.

The circulation system operates as follows: When the vehicle is in motion, the gear pump 17 is likewise in motion, the gears thereof rotating in the direction of the arrows shown in Figure 2 thereby causing the fluid or liquid employed to be drawn from the reservoir 16 and forced under pressure into the lead line 50, as indicated by the arrow immediately above the end of said lead line.

With the valve 18 positioned as indicated by the solid lines in Figure 2, it will be apparent that the fluid or liquid will take the path of least resistance and therefore continue to circulate in lines 46, 50 and 47 through gear pump 17 and valve 18 without in any way affecting the brakes. When the valve 18 is closed assuming the position indicated in dotted lines in Figure 2, it will be apparent that the fluid or liquid cannot then flow back through the line 47 and the liquid under pressure will then be distributed to the brake lead lines 13 and 14 through the central unit 49.

It will be apparent at this time that when the fluid under pressure is transmitted into the lines 13, reference being had to Figure 3, the vessels 41 and 42 will be expanded by the fluid pressure thereby expanding or forcibly separating the plates 27 and 30 causing the friction surfaces 29 and 32 to engage the inner radial wall of the brake drum 22, the web 26 and plates 24, thereby retarding the rotation of the wheels 5, against the pressure of springs 36, 37 and 38, and with the partial aid of the springs 33 and 34. When the valve 18 is again returned to the position indicated by solid lines in Figure 2, the vessels 41 and 42 will be contracted by the pressure produced upon the plates 27 and 30 by the springs 36, 37 and 38, causing some of the fluid in the lines 13 to return to the circulation system through the unit 49. At this time the fluid in the circulation system 15 will again take the path of least resistance and continue to circulate through the lines 46, 50 and 47, without imparting any pressure upon the lead lines 12 and 13 through the unit 49. Since the pressure is thus relieved in the lines 13 and consequently at the brakes, the excess fluid or liquid in the lines leading to the brakes will be permitted to freely leak off or back into the circulation system 15, through the conduit 55, port 60, connecting lead 62 and line 47.

When the fluid is diverted to the line 47' and consequently to the brakes, any instantaneous closing of the valve would normally tend to transmit a great, sudden application of pressure to the brakes. By the provision of relief valve 19, when the brakes are adapted to be applied, some of the initial pressure is dissipated through the relief valve and as the desired pressure is built up, the valve plunger 70 is seated by such excessive pressure in its seat 69 thereby cutting off circulation of the fluid through pump 17, line 50, valve 19 and line 47, so that the maximum pressure is gradually built up and transmitted to the brakes. Thus there is no danger of the application of a sudden high pressure to the brakes and the possibility of instantaneous locking of the brakes is avoided.

Should one or more of the vessels 41 between either of the plates 27 or 30, fail to operate, the expansion of the plates 27 or 30 will still take place due to the counteracting effect of the springs 33 and 34 aiding the vessels 41 as opposed to the springs 36, 37 and 38. In view of the multiplicity of vessels employed, the chances for total failure of operation of the brakes are thereby minimized.

Since the vessels 41 are comparatively small, the volumetric displacement is likewise small and the fluid required by the system is reduced to a minimum. Furthermore, in view of the reduced size of the vessels, the actual transmission of pressure to the brakes will be accomplished in a relatively short interval of time, thereby insuring prompt and practically instantaneous application of the brakes.

The connection of the pump to the line shaft behind the clutch and ahead of the transmission assures operation of the pump from the propeller shaft when the engine stops and the car continues to roll ahead. It will be evident, that if the power plant of the vehicle should fail on an up grade and the car begins to roll backward, suitable automatic means may be provided for reversing the drive from the propeller shaft to the pump in such an emergency, and to this end I have provided a modified circulation system.

Referring now particularly to Figure 5, the modified circulation system comprises a reservoir 75 provided with two outlet lines 76 and 77. Outlet line 76 is connected to a fitting 78 provided with two check valves comprising gravity balls 79 and 80 adapted to normally rest upon transverse pins 81 and 82 respectively. Valve seats 83 and 84 respectively are provided above the valves 79 and 80. A lateral duct 85 is provided between the two check valves and is connected by a suitable line to one side of a pump 86. Pump 86 is of the same type as shown in Figure 2 being provided with gears 87 and 88, gear 87 being operatively associated with a driven shaft 89.

Outlet line 77 is likewise connected to a fitting 90 which is a substantial duplicate of the fitting 78, having check valves comprising balls 91 and 92 adapted to normally rest upon pins 93 and 94 respectively and adapted to be seated in valve seats 95 and 96 respectively. As in the case of fitting 78, a lateral duct 97 is connected by a suitable connection with the side of the pump opposite that to which the fitting 78 is connected. The lower end of the fitting 90 has a line 98 connected thereto, the line being provided with an angularly disposed portion 99 suitably connected to a T union 100. Fitting 78 has a line 101 threaded into the lower end thereof at one end with the other end of the line 101 suitably connected with the leg portion of the union 100.

An inlet line 102 is connected at one end thereof to the reservoir 75 with the other end thereof suitably connected to a three-way valve 103 at the outlet port 104 thereof. Port 105 of the valve 103 is connected with union 100 by a line 106, with the opposed port 107 suitably connected with a line 108 at one end with the other end of the line 108 connected to a T union 109.

Valve 103, as shown in the full line position, is provided with a through port or duct 110 having a right angularly disposed duct 111 extending therefrom to the periphery of the rotatable element of the valve.

A combined pressure relief line and leak-off 112 having a relief valve 113 therein of the type disclosed in Figure 2 of the drawing, connects the inlet line 102 with the line leading to the brakes with the inlet end thereof connected to the leg portion of the union 109 by a pipe 114 and the outlet port 115 thereof connected with the inlet line 102 by a line 116 at 117. The third port of the T union 109 is connected with a line 118 which leads to the central distributing unit 49, shown in Figure 1.

As in the case of the circulation system disclosed in Figure 2, the valve 103 may be operatively associated with and controlled by both the hand control 54 and the pedal control 52 (see Figure 1).

In operation, with the pump gears rotating in the direction of the arrows indicated thereon, pressure is imposed in the direction of the arrow positioned at the pump port adjacent the fitting 90. At this time the ball 91 will be elevated and seated on the valve seat 95 cutting off the line 77, while the ball 92 will remain in its lowermost position resting on the pin 94. Owing to the suction imposed by the pump in the fitting 78, the ball 79 will remain in its lowermost position resting upon pin 81 while the ball 80 will be drawn up against the action of gravity and seated in the valve seat 84 thus cutting off the line 101. With the valve 103 positioned, as indicated in solid lines, only continuous circulation of the fluid within the circulation system will take place.

That is, the fluid will be drawn from the reservoir 75 through the line 76, through fitting 78, thence through the pump 86 to the fitting 90, through line 98, union 100, line 106, ports 111 and 110 of the valve 103, and thence through line 102 returning to the reservoir 75. When the valve 103 is rotated in a direction of the arrow so that the port 104 is dead ended within the valve housing, and the port 110 then connecting lines 106 and 108, thereby cutting off line 102, as indicated in the dotted line position of the valve 103, it will be evident that fluid under pressure will then be transmitted to the brakes. When the fluid flow is first diverted by the valve to the brakes, a portion of this fluid will be initially transmitted back to the return line 102 through the relief valve 113, until the pressure in the lines leading to the brakes will be built up to overcome the spring pressure of the valve when the line 114 will be cut off by the ball of the relief valve and the entire pressure then transmitted to the brakes. Thus, a sudden diversion of the fluid pressure from the circulation system through the brakes, will not be suddenly transmitted to the brakes, thereby avoiding a sudden locking of the brakes.

Upon rotation of the pump gears in a direction opposite to that indicated by the arrow, the pressure flow then resulting in a direction towards the fitting 78, the position of the balls in the fittings 78 and 90 will be reversed. That is, the ball 91 will be resting on pin 93 while ball 92 will be seated in its valve seat 96, and ball 79 on the opposite side of the pump will be seated in valve seat 83, with ball 80 resting on pin 82.

With the position of the valve 103, as indicated in full lines, continuous circulation will take place from the recervoir 75 through line 77, fitting 90, pump 86, fitting 78, line 101, union 100, line 106 through the valve 103, through line 102 and back into the reservoir 75. It will be evident that when the valve 103 is rotated to the dotted line position, pressure may be again imposed upon the brakes with the pump rotating in a direction reversed from that indicated by the arrows therein.

Upon return of the valve 103 to the full line position, the excess fluid in the brake lines can freely drain off through the combined relief and leak-off 112.

While the pump of the circulation system may be mounted on the line shaft ahead of the transmission and behind the clutch, as in the case of the circulation system shown in Figures 1 and 2, it will be evident that owing to the fact that the direction of operation of the pump in the circulation system illustrated in Figure 5 is duo-directional, the circulation system may be positioned so that the pump has operative connection with the propeller shaft of the vehicle.

Thus it will be seen that I have provided a braking system wherein the time required for expanding the brake discs is reduced to a minimum; the amount of fluid or liquid employed by my improved system is also reduced to a minimum; if one or two of any of the vessels employed in a single brake should fail to operate or expand, the remaining vessels will nevertheless effectively provide a positive braking action; and I have also provided a novel and simple fluid circulation system for such a braking system.

It is to be further noted, that I have also provided a novel control means for a service braking system wherein the braking action may be effectively controlled by either the foot or the hand of an operator.

The modified form of circulation system illustrated in Figure 5 is believed to be an innovation in the art. By the employment thereof, the pump employed may be operated in either direction and will be equally effective regardless of the rotational direction of the power take-off connection thereto. Should reversal of operation of the power take-off connection take place, failure of the system such as might occur in a uni-directional flow system is entirely obviated.

In Figure 6 the pipe line 200 corresponds to the line 15 of Figure 2 and to the lines 99 and 106 of Figure 5, and the pipe line 202 corresponds to the line 50 of Figure 2 and to the line 102 of Figure 5. The line leading on to the brakes is indicated at 203 and in this case instead of closing off this line 203 during non-braking periods this line is continually open to the line, including the pipes 200 and 202. For the purpose of controlling the braking action a valve 204, in this particular embodiment in the form of a gate valve, is interposed in the line 202. This gate valve 204 may be of any suitable or preferred form having a sliding gate operated by a suitable operating member. The gate which may be sealed in its enclosing housing by a suitable gland and packing means has a port 205 which when in register with the passage through the line 202 removes all restriction to the free flow of the fluid through the line 202 so that this flow may continue in non-braking circuit as in the previous embodiment but in open communication with the brake line 203 without actually operating or applying the brakes. When, however, the gate member of the valve is moved to move the port 205 out of register with the passage through the pipe 202, this passage is completely closed off, in which case the full effect of the pressure within the system is transmitted through the line 203 and applies the brakes.

In order to prevent excessive pressure application to the brakes with the open brake line of Figure 6, a by-pass connection 206 is preferably provided. This by-pass connection by-passes the gate valve 204 and is provided with a check valve 207 seated downwardly against the seat 208 by a spring 209 abutting a suitable adjusting screw 210 at its opposite end. The action of the spring 209 is preferably such that the valve 207 will be held seated until the braking pressure operable through the line 203 reaches the maximum effective or maximum desirable braking pressure, that is the pressure which will provide maximum braking action without locking the wheels or other braked parts, but when the pressure exceeds that required for safe braking the valve 207 is opened thereby and the closed gate valve 204 is by-passed.

While I have shown several preferred embodiments of my invention, it is to be understood that I do not wish to limit myself thereto. As will be understood by those skilled in the art, certain changes may be made therein without departing from the spirit and scope of the appended claims. What I claim and wish to secure by Letters Patent is:—

1. In combination, a vehicle having wheels, a transmission connected to the wheels, a power plant, a clutch connecting the power plant to the transmission, brake means acting on said wheels adapted to be expanded by fluid pressure, a fluid circulation system, a pump in said system connected between the clutch and transmission, means connecting said fluid pressure circulation system to said brake means, means for controlling said circulation system to apply or release said brake means, said means comprising a valve in said circulation system and means for operating said valve, pressure dissipating means for absorbing a portion of the initial fluid pressure set up upon operation of said valve, and means serving as a leak back connection from said brake means upon return of said valve to its original position.

2. In combination, a vehicle having wheels, a transmission connected to the wheels, a power plant, a clutch connecting the power plant to the transmission, brake means acting on said wheels adapted to be expanded by fluid pressure, a fluid circulation system, a pump in said system connected between the clutch and transmission providing means for maintaining circulation of the fluid in said circulation system, means connecting said circulation system with said brake means, means for controlling said circulation system to apply or release said brake means, and means in said circulation system adapted to relieve a portion of the pressure initially transmitted to said brake means upon setting of said control means to transmit pressure to said brake means.

3. The combination with a vehicle having an engine, a transmission, a driving connection between the engine and the transmission, a clutch in said driving connection and hydraulic brake operating pump means connected with said driving connection between the transmission and said clutch.

4. In combination, in a vehicle braking system, a fluid reservoir, a gear pump connected to said reservoir, an outlet conduit for said pump, a return conduit leading to said gear pump and connected between said pump and reservoir, a valve between said conduits, a third conduit leading through the braking system and connected to said valve, said valve normally providing for continuous circulation of fluid through said pump, outlet conduit and return conduit back to said pump, means for operating said valve to force the fluid into said third conduit, pressure release means connected between said outlet conduit and said return conduit, and leak back means disposed between said third conduit and said return conduit and open only when said valve is in unoperated position.

5. In combination, a vehicle having wheels and an engine, brakes for each of said wheels, a transmission, a driving connection between the engine and the transmission, a clutch in said driving connection, and hydraulic pressure means connected to said driving connection between said transmission and said clutch and operable for actuating said brakes.

6. In combination, a vehicle having a plurality of wheels, an engine carried by said vehicle, brakes for each of said wheels, a transmission, a driving connection between the engine and the transmission, a clutch in said driving connection, hydraulic pressure means connected to said driving connection between said transmission and said clutch and operable to actuate said brakes, and means for actuating said brakes by fluid pressure derived from said pressure means.

7. In combination, a vehicle having a plurality of wheels, an engine carried by said vehicle, a transmission, a driving connection between the engine and the transmission, pressure responsive brake means carried by at least two of said wheels, a clutch in said driving connection, and hydraulic pressure means connected to said driving connection between said transmission and said clutch and operable for actuating said brakes.

8. In combination, in a vehicle, a transmission, an engine having a driving connection with said transmission, a clutch in said driving connection, and fluid brake operating means connected to said driving connection between said clutch and said transmission and adapted to be actuated when said vehicle is moving independently of operation of said engine.

9. In combination, in a vehicle, a transmission, an engine having a driving connection with said transmission, a clutch in said driving connection, and fluid brake operating means connected to said driving connection between said clutch and said transmission and actuated by operation of said engine independently of movement of said vehicle.

10. The combination with a vehicle having an engine, a transmission, and a driving connection therebetween, of a vehicle braking system comprising a gear pump connected to said driving connection, an outlet conduit for said pump, a return conduit leading to said pump, a valve between said conduits, a third conduit leading through the braking system and connected to said valve, said valve normally providing for continuous circulation of fluid through said pump, outlet conduit and return conduit back to said pump, means for operating said valve to force the fluid into said third conduit, pressure release means connected between said outlet conduit and said return conduit, and leak back means disposed between said third conduit and said return conduit and open only when said valve is in unoperated position.

HERMAN C. HEATON.